United States Patent
Ko et al.

(10) Patent No.: US 9,909,531 B2
(45) Date of Patent: *Mar. 6, 2018

(54) ENGINE AND THRUST REVERSER ACTUATION SYSTEM

(71) Applicant: Woodward HRT, Inc., Valencia, CA (US)

(72) Inventors: Galen Ko, San Gabriel, CA (US); Yehuda M. Shapira, Acton, CA (US)

(73) Assignee: Woodward HRT, Inc., Valencia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/066,606

(22) Filed: Mar. 10, 2016

(65) Prior Publication Data

US 2016/0258386 A1     Sep. 8, 2016

Related U.S. Application Data (63) Continuation of application No. 13/678,659, filed on Nov. 16, 2012, now Pat. No. 9,309,835.

(51) Int. Cl.
| | |
|---|---|
| *F02K 1/70* | (2006.01) |
| *F02K 1/72* | (2006.01) |
| *F02K 1/76* | (2006.01) |
| *F02K 3/06* | (2006.01) |
| *F02K 1/56* | (2006.01) |

(52) U.S. Cl.
CPC .............. *F02K 1/763* (2013.01); *F02K 1/563* (2013.01); *F02K 1/566* (2013.01); *F02K 1/766* (2013.01); *F02K 3/06* (2013.01); *F05D 2220/36* (2013.01); *F05D 2260/406* (2013.01)

(58) Field of Classification Search
CPC ............. F02K 1/763; F02K 1/766; F02K 1/72
See application file for complete search history.

(56) References Cited

U.S. PATENT DOCUMENTS

| | | | |
|---|---|---|---|
| 2,751,752 A * | 6/1956 | Metcalf | .................. B64C 13/00 244/227 |
| 4,463,661 A | 8/1984 | Tootle | |
| 5,381,654 A | 1/1995 | Halin | |

(Continued)

FOREIGN PATENT DOCUMENTS

| | | |
|---|---|---|
| EP | 0466316 | 1/1992 |
| EP | 0743443 | 11/1996 |

OTHER PUBLICATIONS

International Search Report and Written Opinion of the International Searching Authority, PCT/US2013/070148, dated Apr. 2, 2014; 10 pages.

(Continued)

*Primary Examiner* — Mary A Davis
(74) *Attorney, Agent, or Firm* — Fish & Richardson P.C.

(57) ABSTRACT

A thrust reverser actuation system for a jet engine having a turbine engine surrounded by a nacelle to define an annular air flow path between the turbine engine and the nacelle, with a thrust reverser having a movable element to reverse the direction of at least a portion of the air flow along the air flow path, where the thrust reverser actuation system includes a hydraulic actuator configured to be operably coupled to the movable element, and a remote actuator that controls the inhibit function of the hydraulic system.

16 Claims, 6 Drawing Sheets

(56) References Cited

U.S. PATENT DOCUMENTS

| | | |
|---|---|---|
| 5,448,884 A | 9/1995 | Repp |
| 5,735,557 A | 4/1998 | Harvey |
| 7,946,105 B2 | 5/2011 | Bristol |
| 9,309,835 B2 * | 4/2016 | Ko .......................... F02K 1/763 |
| 2005/0001095 A1 | 1/2005 | Christensen |
| 2006/0059886 A1 | 3/2006 | Strunk et al. |
| 2008/0110153 A1 | 5/2008 | Seda et al. |
| 2008/0110154 A1 | 5/2008 | Kemper et al. |

OTHER PUBLICATIONS

PCT International Preliminary Report on Patentability, PCT/US2013/070148, dated Nov. 5, 2014, 20 pages.

\* cited by examiner

ENGINE AND THRUST REVERSER ACTUATION SYSTEM

CROSS-REFERENCE TO RELATED APPLICATIONS

This application is a continuation of and claims the benefit of priority to U.S. application Ser. No. 13/678,659, filed on Nov. 12, 2013, the contents of which are hereby incorporated by reference.

BACKGROUND OF THE INVENTION

Contemporary aircraft engines may include a thrust reverse actuation system to assist in reducing the aircraft speed during landing. Typical thrust reversers include a movable element that when in the active position reverses at least a portion of the air flow passing through the engine. During maintenance of such areas of the engine the movement of the movable part is inhibited for safety; currently, this is done manually by a user near the equipment that controls the hydraulic flow to the movable element.

BRIEF DESCRIPTION OF THE INVENTION

In one embodiment, the invention relates to a turbofan engine having a turbine engine, a nacelle surrounding the turbine engine and defining an annular bypass duct through the turbofan engine to define a generally forward-to-aft bypass air flow path, a thrust reverser having at least one movable element, movable to and from a reversing position where at least a portion of the bypass air flow path is reversed, a hydraulic actuator coupled to the movable element to move the movable element into and out of the reversing position, a hydraulic lockout, and a lockout actuator wherein the hydraulic lockout may be placed in either the inhibit or permit condition without requiring access to the hydraulic lockout.

In another embodiment, the invention relates to a thrust reverser actuation system for a jet engine having a turbine engine surrounded by a nacelle to define an annular air flow path between the turbine engine and the nacelle, with a thrust reverser having a movable element to reverse the direction of at least a portion of the air flow along the air flow path, the thrust reverser actuation system including, a hydraulic actuator configured to be operably coupled to the movable element, an isolation control unit having a valve selectively operable to control the supply of hydraulic fluid to the hydraulic actuator, a lever operably coupled to the valve, and a remote actuator operably coupled to the lever and configured to move the lever.

DESCRIPTION OF EMBODIMENTS OF THE INVENTION

Figure 1:
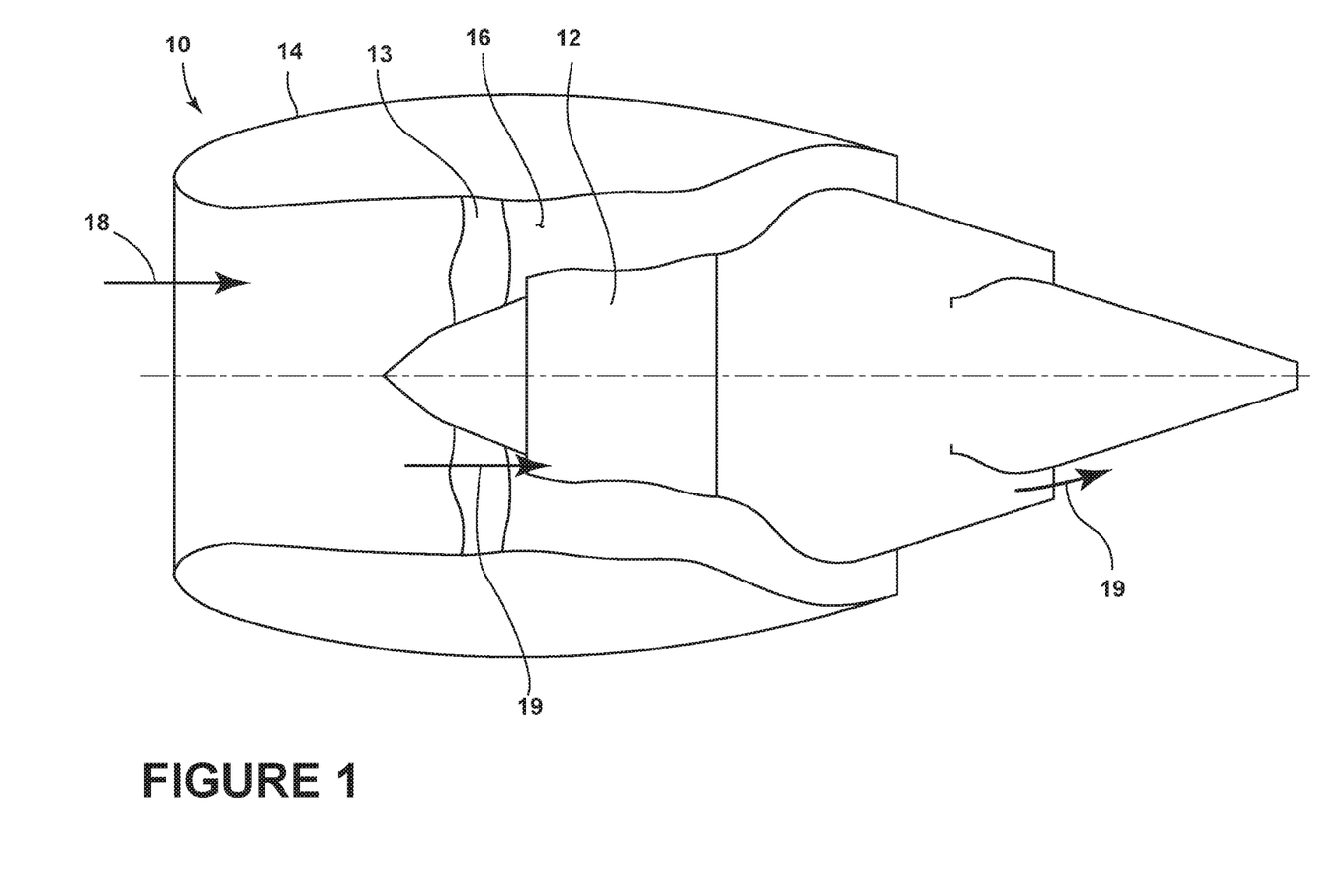
FIG. 1 is a schematic view of a turbofan jet engine with a portion of the outer nacelle cut away for clarity.

FIG. 1 illustrates a turbofan jet engine assembly 10 having a turbine engine 12, a fan assembly 13, and a nacelle 14. Portions of the nacelle 14 have been cut away for clarity. The nacelle 14 surrounds the turbine engine 12 and defines an annular air flow path or annular bypass duct 16 through the jet engine assembly 10 to define a generally forward-to-aft bypass air flow path as schematically illustrated by the arrow 18. A combustion airflow is schematically illustrated by the arrows 19.

Figure 2:
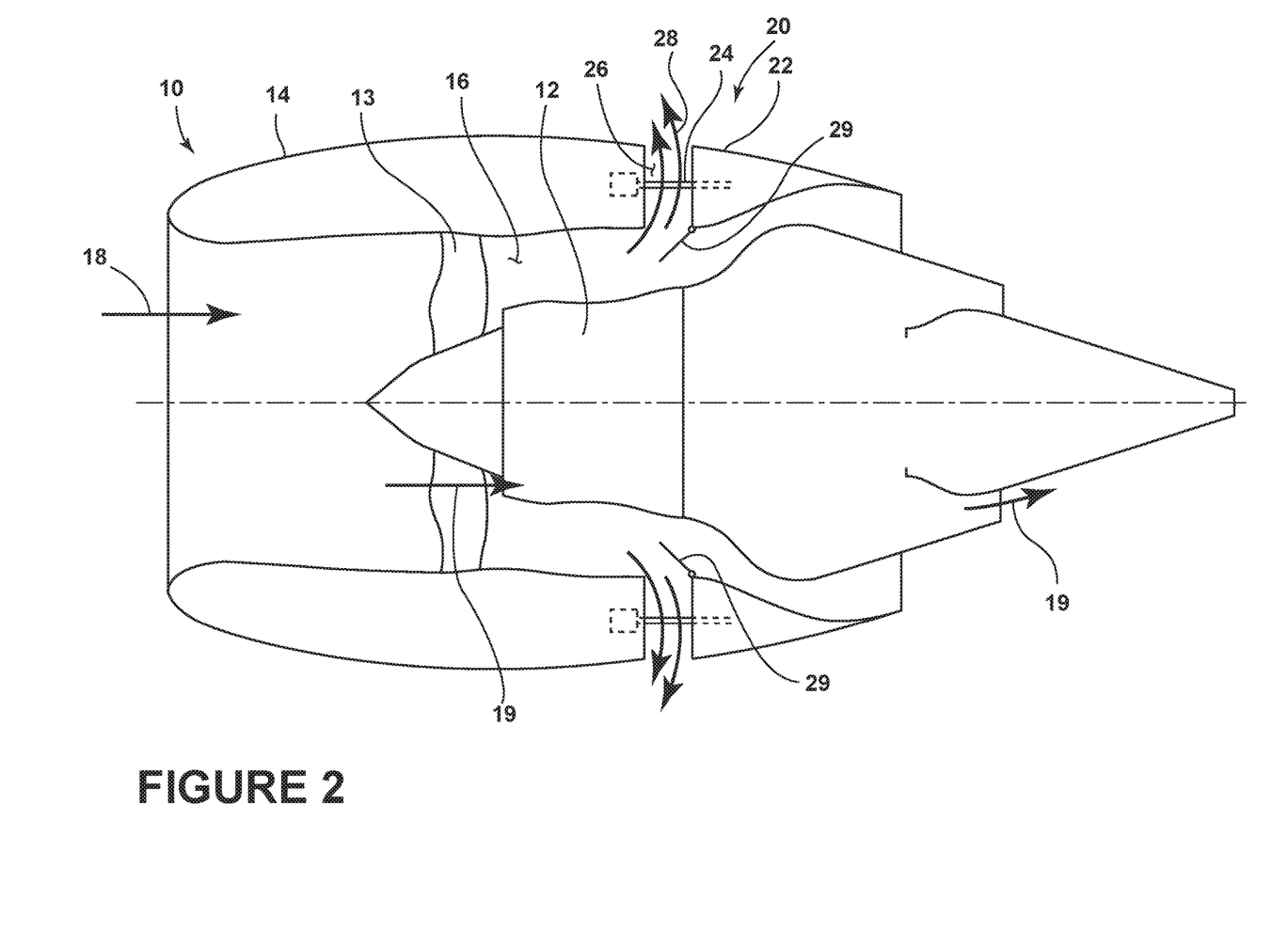
FIG. 2 is a schematic view of the engine of FIG. 1 with an exemplary thrust reverser.

A thrust reverser with at least one movable element, which is movable to and from a reversing position, may be used to change the direction of the bypass airflow. In the reversing position the movable element may be configured to reverse at least a portion of the bypass air flow. There are several methods of obtaining reverse thrust on turbofan jet engine assemblies. FIG. 2 schematically illustrates one example of a thrust reverse 20 that may be used in the turbofan jet engine assembly 10. The thrust reverser 20 includes a movable element 22. The movable element 22 has been illustrated as a cowl portion that is capable of axial motion with respect to the forward portion of the nacelle 14. A hydraulic actuator 24 may be coupled to the movable element 22 to move the movable element 22 into and out of the reversing position. In the reversing position, as illustrated, the movable element 22 limits the annular bypass area between the movable element 22 and the turbine engine 12, it also opens up a portion 26 between the movable element 22 and the forward portion of the nacelle 14 such that the air flow path may be reversed as illustrated by the arrows 28. An optional deflector or flap 29 may be included to aid in directing the air flow path between the movable element 22 and the forward portion of the nacelle 14.

Figure 3:
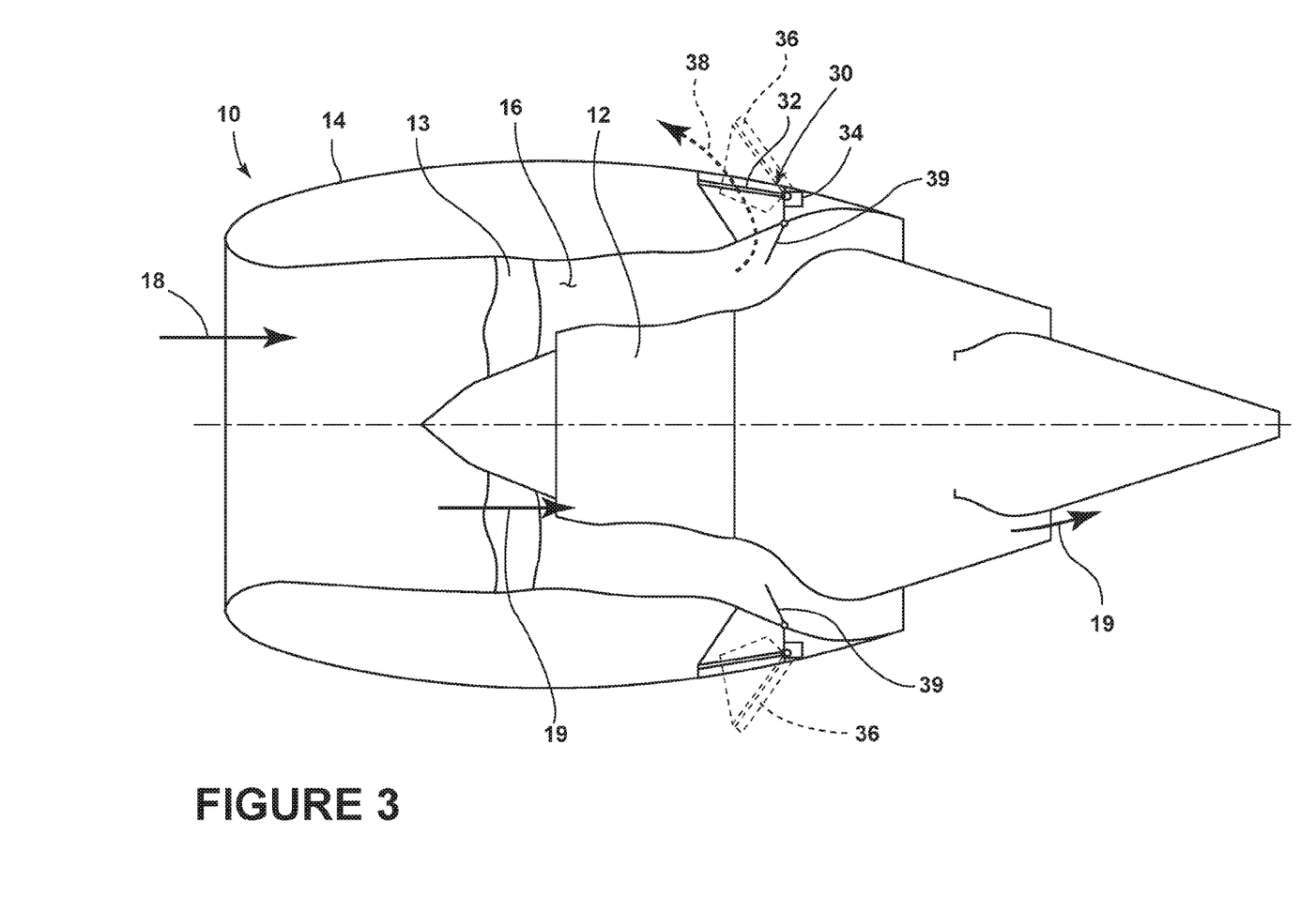
FIG. 3 is a schematic view of the engine of FIG. 1 with an alternative exemplary thrust reverser.

FIG. 3 schematically illustrates an alternative thrust reverser 30. The thrust reverser 30 includes a movable element 32. The movable element 32 has been illustrated as a deflector, which may be built into a portion of the nacelle 14. A hydraulic actuator 34 may be coupled to the movable element 32 to move the movable element 32 into and out of the reversing position. In the reversing position, shown in phantom and indicated at 36, the movable element 32 turns that air outward and forward to reverse its direction as illustrated by the arrows 38. An optional deflector or flap 39 may be included to aid in directing the air flow path outward.

Figure 4:
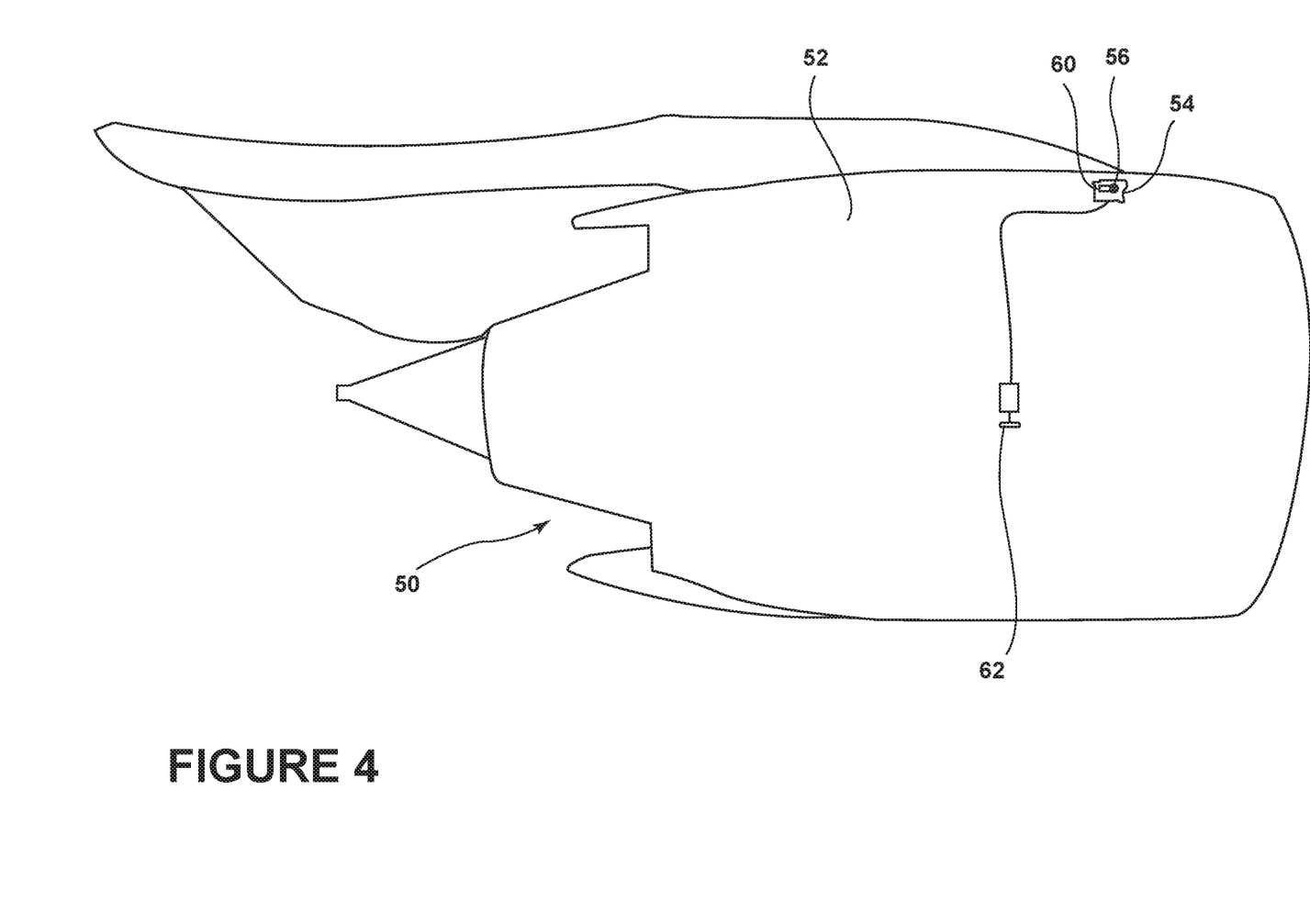
FIG. 4 is a perspective view of a turbofan engine according to an embodiment of the invention.

In both illustrative examples, the thrust reverser changes the direction of the thrust force. Both the thrust reverser 20 and the thrust reverser 30 have been described as hydraulically operated systems and a hydraulic actuator has been schematically illustrated. The hydraulic system that is used to move the movable element may be at the top of the nacelle to reduce the distance the hydraulic lines have to run. For example, FIG. 4 illustrates a perspective view of a jet engine assembly 50 having a nacelle 52, which is similar to the turbofan jet engine assembly 10 described above and may include any suitable thrust reverser having at least one movable element. A hydraulic actuator 54 may be coupled to the movable element to move the movable element into and out of the reversing position. The hydraulic actuator 54 is illustrated as being located near a top of the nacelle 52. The hydraulic actuator 54 may be any type of suitable actuator for moving the movable element to and from a reversing position. It will be understood that there may be more than one hydraulic actuator and that such hydraulic actuators may be located at various positions.

A valve 56 may control the flow of hydraulic fluid to the hydraulic actuator 54 and may be considered to be a portion of the hydraulic actuator 54. Alternatively, the valve 56 may form an isolation control unit that is separate from the hydraulic actuator. Regardless, the valve 56 may be selectively operable to control the supply of hydraulic fluid to the hydraulic actuator 54.

A hydraulic lockout 60 may be operably coupled to the hydraulic actuator 54 and movable between an inhibit condition, wherein movement of the hydraulic actuator 54 is prevented, which is useful during maintenance of the system, and a permit condition, wherein movement of the hydraulic actuator 54 is permitted, which is useful during normal operation of the aircraft. The hydraulic lockout 60 may normally be in the inhibited condition to prevent the operation of the hydraulic actuator 54. A remote actuator or lockout actuator 62 may be operably coupled to the hydraulic lockout 60 and located remotely from the hydraulic lockout 60. The lockout actuator 62 is not located near the top of the nacelle 52. Thus, it will be understood that the hydraulic lockout 60 may be placed either in the inhibit or permit condition by the lockout actuator 62 without requiring access to the hydraulic lockout 60. In the illustrated example, the lockout actuator is located near a side of the nacelle 52. The location of the lockout actuator 62 may be selected to alleviate the difficulty envisioned for ground personnel in accessing the hydraulic lockout 60, which is not readily accessible from the ground. The location of the lockout actuator 62 can be positioned such that it is reachable by personnel while standing on the ground or on a ladder, and without the need to climb on top of the engine.

Figure 5:
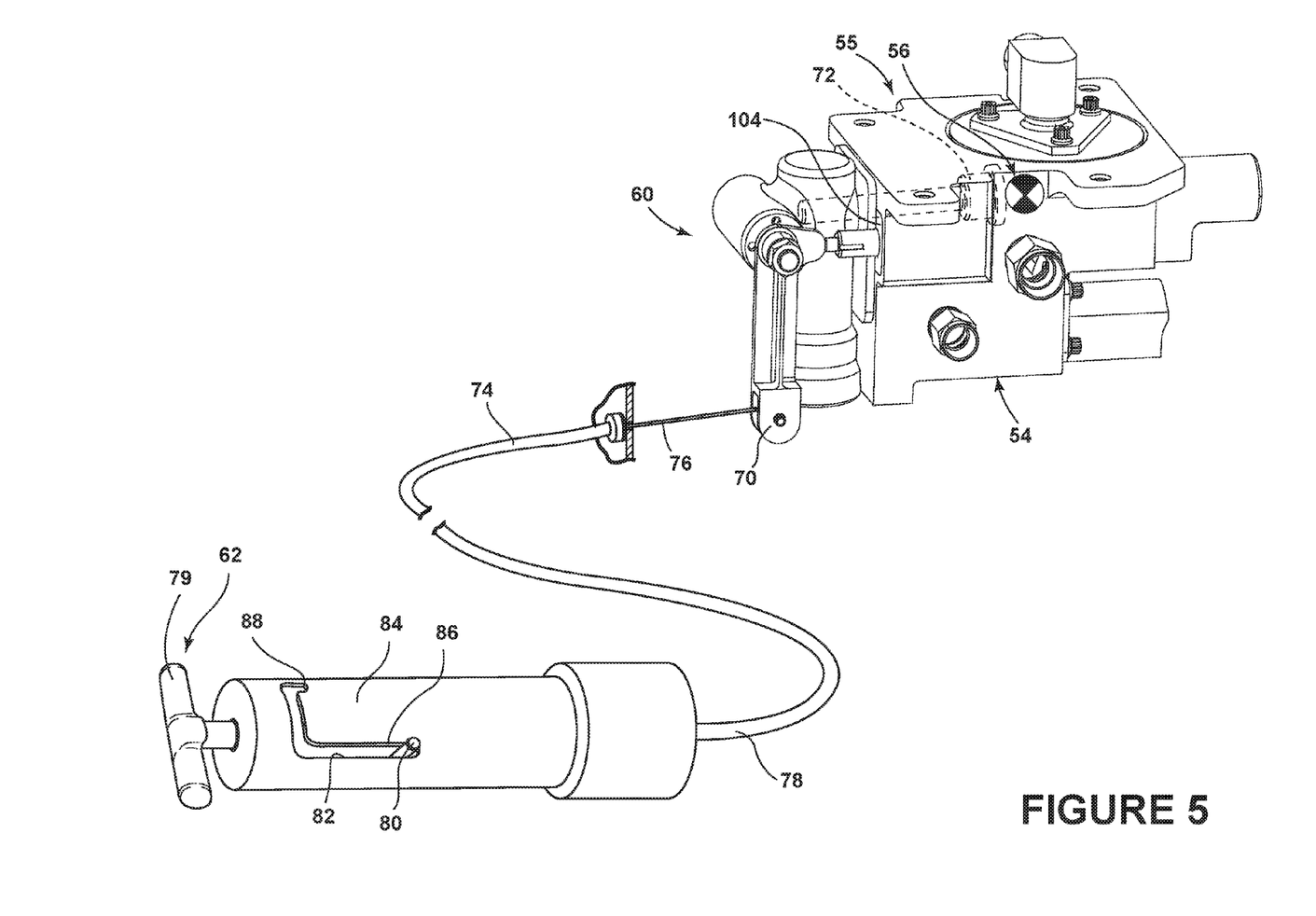
FIG. 5 is a perspective view of an isolation control unit, lever, and remote actuator for use in the engine of FIG. 4.

FIG. 5 illustrates one exemplary embodiment of the isolation control unit, indicated at 55, which is separate from the lockout actuator 62. The isolation control unit 55 is merely one embodiment of the invention, where the valve 56 is located within the isolation control unit 55.

The valve 56 has been schematically illustrated and may be selectively operable to control the supply of hydraulic fluid to the hydraulic actuator 54. The valve 56 may be any suitable type of valve including a spool valve. It is contemplated that the valve 56 may be in a normally closed condition to inhibit the flow of hydraulic fluid to the hydraulic actuator 54.

Figure 6:
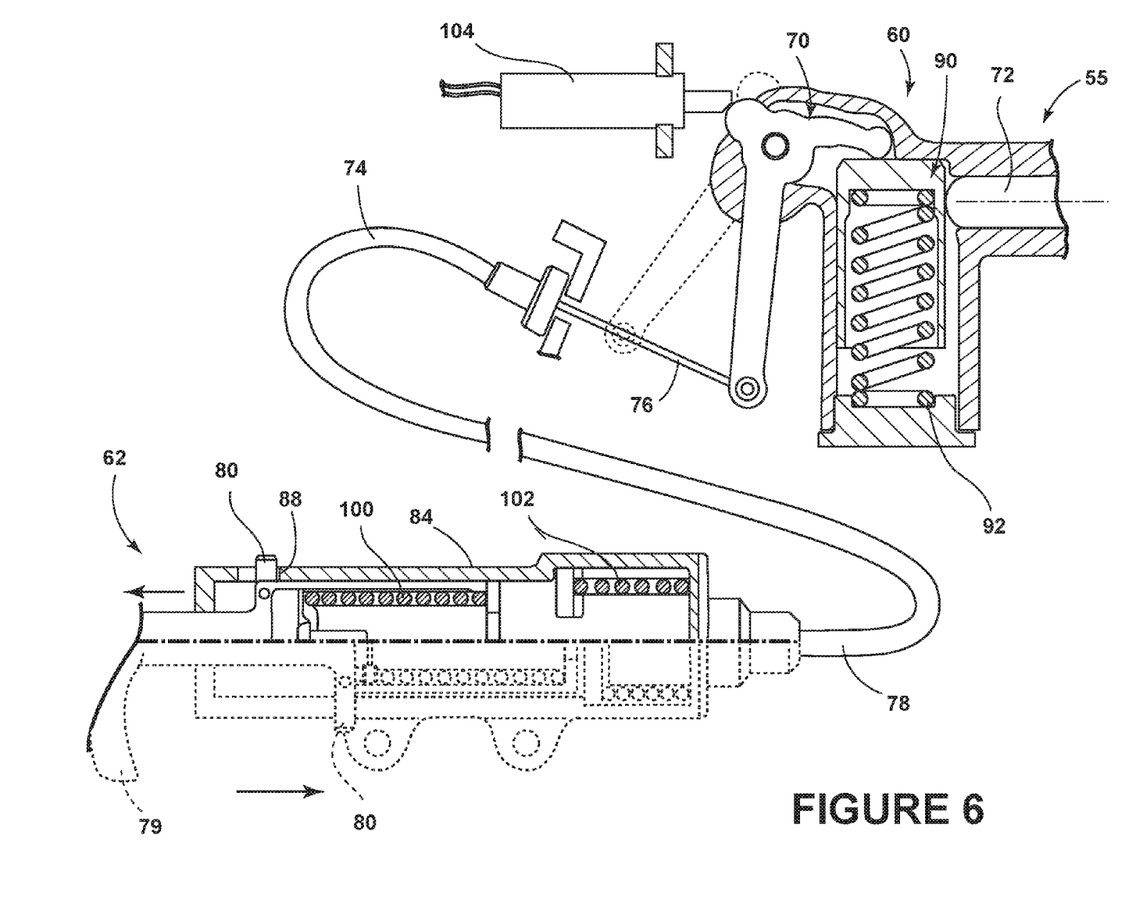
FIG. 6 is a perspective view of the isolation control unit, lever, and remote actuator of FIG. 5, illustrating both an inhibit condition and a permit condition.

In the exemplary embodiment, the hydraulic lockout 60 has been illustrated as including a lever 70 operably coupled with a plunger 72. The plunger 72 may in turn be operably coupled to the valve 56 or portions of the valve 56. The lever 70 may be movable between a first position, corresponding to the inhibit condition of the hydraulic actuator 54 (as shown), and a second position, corresponding to the permit condition of the hydraulic actuator 54 (FIG. 6 in phantom). More specifically, the lever 70 may be operably coupled to the valve 56, for example through the plunger 72, and may be movable between a first position and a second position to move the valve 56 between its normally closed condition and an open condition to control the flow of hydraulic fluid to the hydraulic actuator 54. The lever 70 may be formed in any suitable manner and may be operably coupled with the plunger 72 in any suitable manner.

The lockout actuator 62 may be operably coupled to the lever 70 and configured to move the lever 70 between the first and second positions. In the illustrated example, the lockout actuator 62 includes a movable cable 74 having a first portion 76 connected to the lever 70 and a second portion 78 remote of the lever 70. The second portion 78 may be attached to a handle 79. The second portion 78 may also include a projection 80 that is maintained within an opening 82 in a housing 84. The opening 82 may be a J-shaped profile having a long leg 86 and a short leg 88. When the projection 80 is in the long leg the lever 70 may be retained in the first position when the projection 80 is moved into the short leg 88 the lever 70 may be retained in the second position.

As illustrated in FIG. 6, one or more biasing elements may be included to aid in the retention of the projection 80 in the various positions. For example, a first spring 100 and a second spring 102 have been illustrated as being included. In this manner the projection 80, opening 82, and springs 100 and 102 create a locking mechanism to retain the lever 70 in the first and second positions.

The lever 70 may be biased into the first position unless it is locked in the second position. The spring 100 may aid in moving the projection 80 towards the end of the long leg 86 and thus the lever 70 to the first position. The spring 100 allows for handle over-stroke so that tension is kept on the lever 70 and biasing element 90. Furthermore, the hydraulic lockout 60 may include a biasing element 90 to maintain the hydraulic lockout 60 in the inhibit condition. The biasing element 90 has been illustrated as including a spring 92 but may include any suitable biasing element. The lever 70 may include a shaped profile to maintain the hydraulic lockout 60 in the inhibited condition.

A switch 104 has also been illustrated and may be operably coupled to the lever 70. It is contemplated that movement of the lever 70 will activate the switch, which may affect the actuation of an indication device. For example, the indication may alert a user whether the hydraulic lockout 60 is in the inhibit or permit state depending upon the switches coupling to the lever 70.

During operation, the lever 70 may normally be in the first position. The bias provided by the biasing element 90 maintains the hydraulic lockout 60 in the inhibit condition. The hydraulic lockout 60 is operably coupled to the valve 56 to prevent the movement of the valve 56 when the hydraulic actuator 54 is in the inhibit condition. More specifically, in such an inhibit condition the lever 70 depresses the plunger 72 located within the valve 56. In the case of the valve 56 being a spool valve the plunger 72 may hold the spool within the valve 56 in the inhibited state such that fluid is blocked from the hydraulic actuator 54. Thus, the plunger 72 is the part of the hydraulic lockout 60 that ultimately blocks the hydraulic valve movement.

To enable the operation of the valve 56 the hydraulic lockout 60 must be unlocked through the lockout actuator 62. More specifically, the lever 70 must be moved to the second position by user activation through the lockout actuator 62. To do this the handle 79 of the cable 74 must be pulled out against the opposing bias force provided by the biasing element 90, rotated out of its locked position within the opening 82 and is then pinned in the active position when the projection 80 is in the short leg 88. This action rotates the lever 70 into the second position where the plunger 72 is not depressed and the spool is moved such that the valve 56 is in an open condition and allows fluid to reach the hydraulic actuator 54. To inhibit the system again the user simply reverses the movement of the lockout actuator by pulling and rotating the handle 79 to overcome the pinning force create by the spring 102. The spring 102 provides tension in the assembly during the inhibit state.

The embodiments described above provide for a variety of benefits including that movement of the movable element of the thrust reverser may be inhibited for crew safety. The embodiments described above revert automatically to an inhibit state unless manually placed and locked in the active state. The above described embodiments provide enhanced safety with regard to inadvertent deployment during flight as well as enhanced safety during maintenance. Further, the lockout actuator may be provided such that it is easy for ground personnel to access the otherwise less than accessible hydraulic lockout. A time and cost savings is achieved as maintenance personnel need not directly access the hydraulic actuator at the top of the nacelle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A hydraulic lockout apparatus comprising:
   a hydraulic actuator configured to be mechanically coupled to at least one movable cowl portion or deflector and configured to move the at least one movable cowl portion or deflector into and out of a selected position;
   a valve hydraulically coupled to the hydraulic actuator and operable to control a flow of hydraulic fluid to the hydraulic actuator;
   a hydraulic lockout mechanically contactable to the valve and movable between an inhibit condition in which mechanical contact directly between the hydraulic lockout and the valve prevents mechanical movement of the valve and maintains the valve in a position that prevents the flow of the hydraulic fluid to the hydraulic actuator, and a permit condition in which disconnection of mechanical contact directly between the hydraulic lockout and the valve permits mechanical movement of the valve to a position that permits the flow of the hydraulic fluid to the hydraulic actuator;
   a lockout actuator located remotely from the hydraulic lockout and having a handle that is moveable between an inhibit configuration and a permit configuration; and
   a moveable cable having a first portion connected to the hydraulic lockout and a second portion connected to the handle and configured to mechanically actuate the hydraulic lockout to the inhibit condition when the handle is in the inhibit configuration or to the permit condition when the handle is in the permit configuration without requiring direct manual access to the hydraulic lockout.

2. The hydraulic lockout apparatus of claim 1 wherein the hydraulic actuator is located near a top of a turbofan engine nacelle and the lockout actuator is not located near the top of the nacelle.

3. The hydraulic lockout apparatus of claim 2 wherein the lockout actuator is located near a side of the nacelle.

4. The hydraulic lockout apparatus of claim 1 wherein the hydraulic lockout is normally in the inhibit condition.

5. The hydraulic lockout apparatus of claim 4 wherein the hydraulic lockout further comprises at least one spring to maintain the hydraulic lockout in the inhibited condition.

6. The hydraulic lockout apparatus of claim 5 wherein the lever comprises a shaped profile to maintain the hydraulic lockout in the inhibited condition.

7. The hydraulic lockout apparatus of claim 1 wherein the hydraulic lockout comprises a lever operably coupled to the valve, with the lever movable between a first position, corresponding to the inhibit condition, and a second position, corresponding to the permit condition.

8. The hydraulic lockout apparatus of claim 7 wherein the movable cable has a first portion connected to the lever and a second portion remote of the lever.

9. The hydraulic lockout apparatus of claim 8 wherein the lever is biased into the first position.

10. A fluid actuation system reverser having a movable cowl portion or deflector to fluid actuation system comprising:
    a fluid actuator configured to be mechanically linked to a movable cowl portion or deflector;
    an isolation control unit having a valve selectively operable to control a supply of fluid to the fluid actuator, with the valve being in a normally closed condition to inhibit a flow of fluid to the fluid actuator;
    a lever mechanically contactable to the valve and movable between a first position in which the lever is in direct mechanical contact with the valve to prevent mechanical movement of the valve and maintain the valve in the normally closed configuration, and a second position in which the lever is disconnectable from direct mechanical contact with the valve to permit movement of the valve away from the normally closed position;
    a remote actuator having a handle that is moveable between a first configuration and a second configuration; and
    a moveable cable having a first portion connected to the lever and a second portion connected to the handle and configured to mechanically actuate the lever to the first position when the handle is in the first configuration or to the second position when the handle is in the second configuration without requiring direct manual access to the isolation control unit.

11. The fluid actuation system of claim 10 wherein the fluid actuator is located near a top of a turbofan engine nacelle and the remote actuator is not located near the top of the nacelle.

12. The fluid actuation system of claim 10 wherein the movable cable has a first portion connected to the lever and a second portion remote of the lever.

13. The fluid actuation system of claim 12 wherein the lever is biased into the first position.

14. The fluid actuation system of claim 10, further comprises at least one spring to maintain the lever in the first position.

15. The fluid actuation system of claim 14 wherein the lever comprises a shaped profile to maintain the lever in the first position.

16. A lockout apparatus comprising:
    a fluid actuator configured to be mechanically coupled to at least one movable cowl portion or deflector and configured to move the at least one movable cowl portion or deflector into and out of a selected position;
    a valve hydraulically coupled to the fluid actuator and operable to control a flow of hydraulic fluid to the fluid actuator;
    a fluid lockout mechanically contactable to the valve and movable between an inhibit condition in which mechanical contact directly between the hydraulic lockout and the valve prevents mechanical movement of the valve and maintains the valve in a position that prevents the flow of the hydraulic fluid to the fluid actuator, and a permit condition in which disconnection of mechanical contact directly between the hydraulic lockout and the valve permits mechanical movement of the valve to a position that permits the flow of the hydraulic fluid to the actuator;

a lockout actuator located remotely from the fluid lockout and having a handle that is moveable between an inhibit configuration and a permit configuration; and, a moveable cable having a first portion connected to the fluid lockout and a second portion connected to the handle and configured to mechanically actuate the fluid lockout to the inhibit condition when the handle is in the inhibit configuration or to the permit condition when the handle is in the permit configuration without requiring direct manual access to the fluid lockout.

* * * * *

UNITED STATES PATENT AND TRADEMARK OFFICE
CERTIFICATE OF CORRECTION

PATENT NO. : 9,909,531 B2
APPLICATION NO. : 15/066606
DATED : March 6, 2018
INVENTOR(S) : Galen Ko and Yehuda M. Shapira Page 1 of 1

It is certified that error appears in the above-identified patent and that said Letters Patent is hereby corrected as shown below:

In the Specification

Column 1, Line 9, delete "Nov. 12, 2013," and insert -- Nov. 16, 2012, --.

Signed and Sealed this
Eleventh Day of December, 2018

Andrei Iancu
*Director of the United States Patent and Trademark Office*